April 12, 1960 W. A. BARNES ET AL 2,932,221
DIE MOVEMENT CONTROL FOR COLD PRESSURE WELDING
Filed July 2, 1957 4 Sheets-Sheet 1

INVENTORS
WILLIAM A. BARNES
WALTER J. ROZMUS
BY Pyle & Fisher
ATTORNEYS

April 12, 1960 W. A. BARNES ET AL 2,932,221
DIE MOVEMENT CONTROL FOR COLD PRESSURE WELDING
Filed July 2, 1957 4 Sheets-Sheet 2

INVENTORS
WILLIAM A. BARNES
BY WALTER J. ROZMUS
ATTORNEYS

April 12, 1960     W. A. BARNES ET AL     2,932,221
DIE MOVEMENT CONTROL FOR COLD PRESSURE WELDING
Filed July 2, 1957     4 Sheets-Sheet 3

INVENTORS
WILLIAM A. BARNES
WALTER J. ROZMUS
BY Pyle & Fisher
ATTORNEYS

April 12, 1960 W. A. BARNES ET AL 2,932,221
DIE MOVEMENT CONTROL FOR COLD PRESSURE WELDING
Filed July 2, 1957 4 Sheets-Sheet 4

INVENTORS—
WILLIAM A. BARNES
WALTER J. ROZMUS
BY Pyle & Fisher
ATTORNEYS

United States Patent Office 2,932,221
Patented Apr. 12, 1960

2,932,221

DIE MOVEMENT CONTROL FOR COLD PRESSURE WELDING

William A. Barnes, Utica, and Walter J. Rozmus, Whitesboro, N.Y., assignors to Kelsey-Hayes Company, Detroit, Mich., a corporation of Delaware Application July 2, 1957, Serial No. 669,540

6 Claims. (Cl. 78—82)

This invention relates in general to gripping and forming apparatus intended for cold pressure welding, and relates more specifically to mechanism for controlling the closing action of split die sections upon a workpiece, and to the control of movement of the closed split die toward another die with a pressure weld action.

Apparatus for manual pressure welding, wherein die carriages are driven toward one another by manipulation of handle grip members, have now become well known by the pressure welding industry. Such devices require the workpieces to be individually loaded and secured in opposed split die members, and each workpiece is prepared and trimmed while held in its die, to a specific projection from the face of the die. Thereafter the dies are driven together by a manual operation of the handle members to cause the unique lateral flow now known to be the true characteristic of cold pressure welding.

Although such manual operation is highly successful, and is still very useful for its intended purpose and probably will always be so, there is need for production welding at a faster rate, and there is need for welding pieces beyond the power capacity of a human operator. Larger size workpieces are difficult to set tightly into a split die holder under the limitations of presently known manual operation.

Therefore, a broad object of the present invention is to provide opposed split dies adapted first to each close upon separate workpieces and thereafter close toward one another to drive the workpieces together.

A more specific object of the present invention is to provide improved die space adjustment devices capable of determining the distance between dies at the beginning of a work cycle in order to eliminate the need for trimming of the workpieces to length with respect to the die faces.

A further general object of the present invention is to provide die control means to cause a tight grip upon each workpiece by each split die before the opposed dies can close together.

A more specific object of the invention pertaining to sloping cam actuated dies is to provide improved resistance devices which resist the closing movement of the opposed dies and cause a tight gripping action before the dies can close toward one another.

Another object of this invention, therefore, is to provide opposed dies reciprocable toward and away from one another, with stop pins determining the maximum separation distance, wherein the stop pins are axially shiftable and have contact surfaces which are adjustable along the die movement path by reason of such axial shiftability.

This application is a continuation in part of an application entitled "Machine and Die Control Apparatus for Applying Cold Welding Pressures," by William A. Barnes and Stanley A. Zysk, Serial No. 662,291, filed May 28, 1957. There the basic concept was disclosed, among others, of controlled spacing of two sets of split dies in order to predetermine an amount of weld flow metal available for pressure welding. Also, the basic concept is there disclosed of providing a resistance against closing of cam driven dies, in order to build up a strong workpiece grip. It is to be noted that this prior application referred to is a continuation in part of a previous application entitled "Apparatus for Butt Welding," Serial No. 481,596, filed January 13, 1955.

Other objects and a fuller understanding of the invention may be had by referring to the following description and claims, taken in conjunction with the accompanying drawings, in which:

Figure 1:
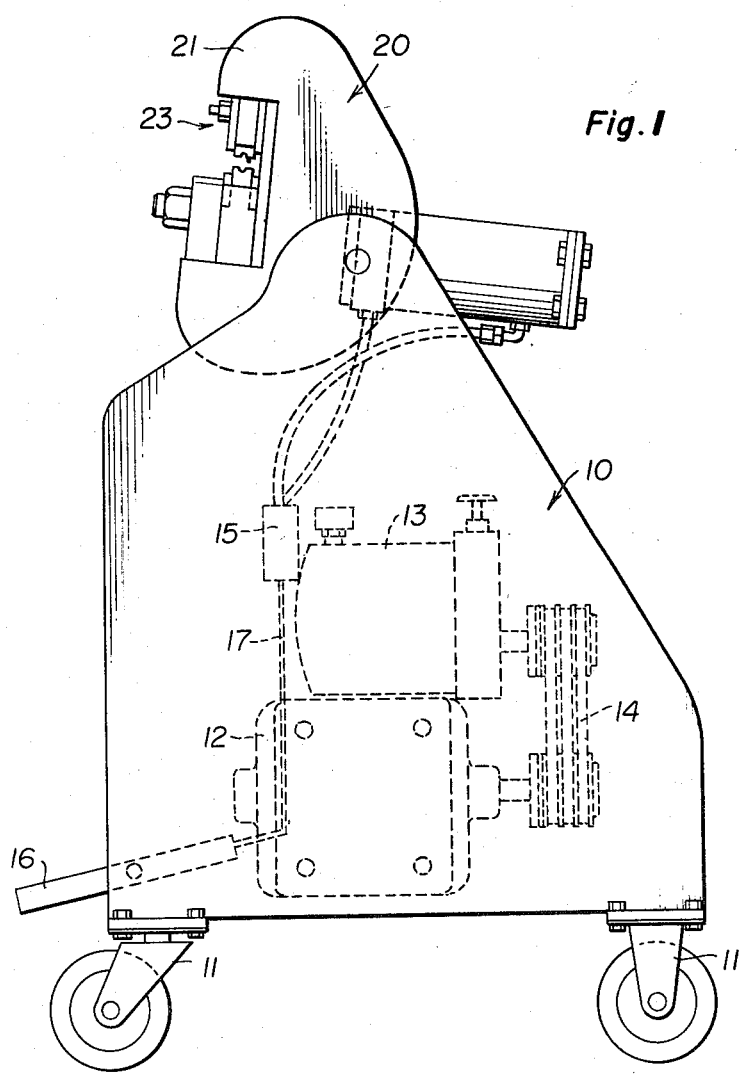
Figure 1 is a general illustration in side elevation of a portable press welder embodying a cam driven carriage actuator, and adapted to embody the principles of this invention.

A portable model of a welding machine, which has embodied therein the fundamental features of this invention, is set forth in Figure 1 of the drawings. This model is carried and operated by mechanism contained within a tote housing 10 made portable by casters 11.

A fluid power system is housed within the tote housing 10. A motor 12 and hydraulic pump 13 are drawn in dotted outline. A belt system 14 interconnects the two for power transmission. A four-way valve 15 is controlled by the operator of the device through a foot treadle 16 operating a control link 17.

Improved cold pressure welding dies and controls for such dies according to this invention are carried in a head assembly 20. The assembly 20 is essentially a small press embodied in a C frame 21.

This particular embodiment of the invention has been developed principally for the cold pressure welding of metals. It has been found that some metals, aluminum and copper in particular, can be united with an exceptionally strong weld without the use of heat or foreign substances. Such welding is accomplished by gripping the workpieces tightly and forcing them together under strictly controlled conditions. These conditions, metallurgically, are now fully disclosed, in both literature and issued patents, and is well understood by metallurgists skilled in this art.

The inventors of the parent case of which this case is a continuation-in-part recognized certain basic concepts of spacing dies to avoid the necessity of interruption of the weld process after a workpiece has been gripped by a pair of split dies. This invention provided an improved means of adjusting the gap between such dies in order to compensate for errors of die manufacture or wear in the dies.

Additionally, when workpieces of very small size are welded by power actuated opposed split dies, the power separation of the dies sometimes has resulted in destruction of the weld because of interlocking of the excess flash material with the welding dies. When all four of the dies are separated under power a failure may sometimes be induced into the workpiece. Accordingly, this invention now provides a means for causing a progressive die separation. That is, two of the dies are held tightly upon the workpiece as the die carriages are separated, and after all other dies have opened, then they separate to allow the workpiece to fall free.

Gripping action and die closing force for cold pressure welding has been provided by sloping cam surfaces prior to this disclosure. Application Serial No. 481,596, filed January 13, 1955 is a parent to the case from which this continuation in part springs. However, even prior to the filing of Serial No. 481,596, a related inventor, Sowter, received a British Patent No. 689,927 which showed such a basic concept. This invention is an improvement upon those prior teachings. By the cam process of die closing, the two halves of a split die are brought together by the first closing action of a press device. After the surfaces of the split dies have mated, the press produces a transverse load upon the mated dies. This transverse load causes a sliding movement of the dies in a lateral direction by reason of sloping cam surfaces upon which the dies are seated. By employing two opposed cam surfaces and two separate sets of split dies, therefore, workpieces may first be gripped and then driven together by such a device. It will become readily apparent that the amount of closing force between two split members prior to the lateral movement will depend entirely upon the resistance to the lateral movement. If the split die members are allowed to ride very loosely upon their sliding cam surfaces, then very little gripping action will take place between the dies prior to the lateral closing action. Therefore, very little gripping force is exerted upon a workpiece. This low workpiece gripping characteristic has seriously limited the usefulness of the inwardly sloping cam principle as set forth prior to the present inventions.

Figure 2:
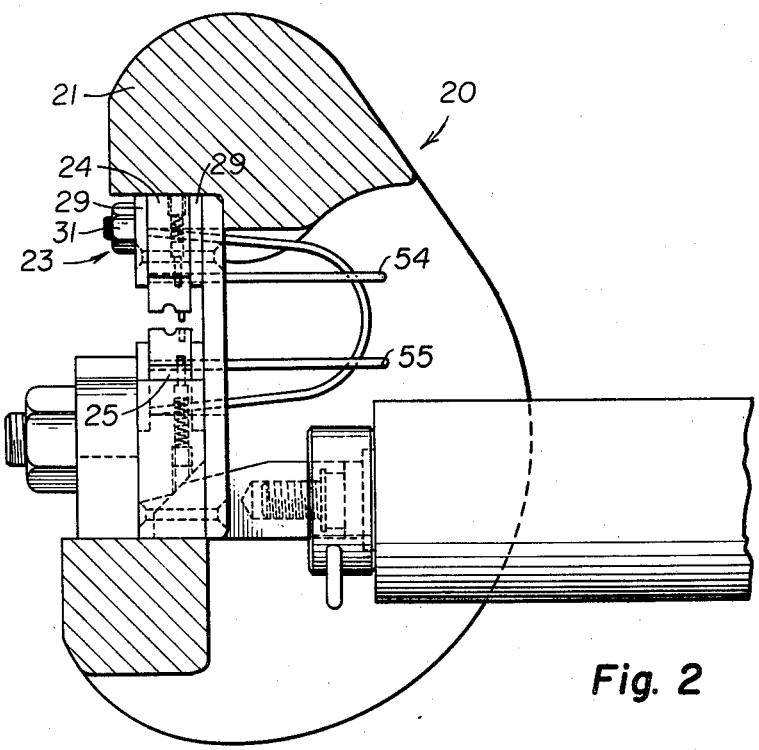
Figure 2 is a side elevation, enlarged with respect to Figure 1, of the C shaped press portion of the device shown in Figure 1, and illustrating in more detail the fundamental concept of die spacing devices and die retaining devices.
Figure 3:
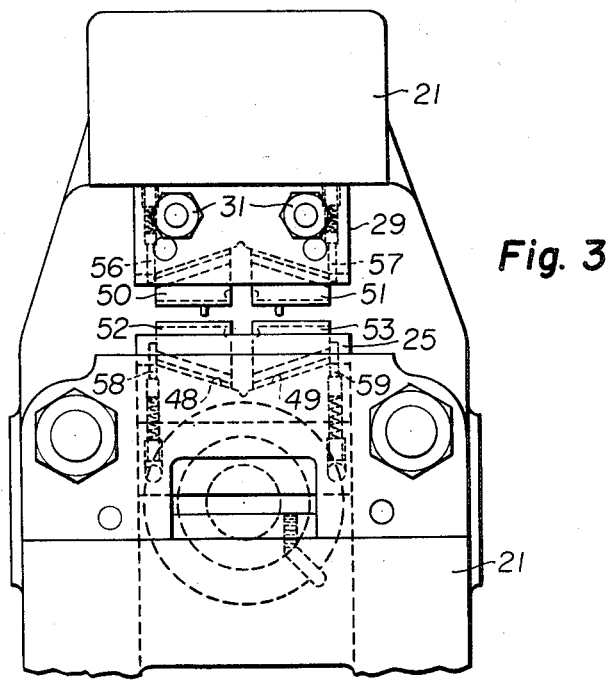
Figure 3 is a front view of the head shown in Figure 1.

In order to show the logical development for a full understanding of the present invention, reference is made first to the more basic concept of the invention as set forth in Figures 1 through 3. In these figures of the drawings, a stationary die carriage 23 is carried at the upper mouth portion of the C shaped frame 21. This die carriage 23 is preferably a composite structure embodying a center block 24 sandwiched between side rails 29 and held in the illustrated position by a clamping bolt 31. Figure 3 best illustrates inwardly sloping slide surfaces in an inverted V relationship. These inwardly sloping slide surfaces are utilized as closing cams upon which die halves 50 and 51 may ride. It will be seen that an upward force upon dies 50 and 51 will cause a closing cam action forcing these die halves toward one another. Side rails 29, in conjunction with the center block 24, provide a guide slot to direct the dies 50 and 51 in movement toward and away from one another.

A bottom die carriage 25 of similar construction provides sloping surfaces 48 and 49 in a V relationship to act as closing cams. Die halves 52 and 53 are designed to ride these surfaces and close with respect to one another under vertical forces.

In the embodiment of the invention shown in the first three figures of the drawings, the dies are held in tight contact with their cam surfaces, and resistance to closing of the dies, is provided by hair springs 54 and 55.

In a uniting of workpieces, such for example as wire, by cold pressure butt welding, the workpieces are held by dies and forced tightly against one another in such a manner that the workpieces are caused to flow laterally in surface contact under extreme pressure and under confinement. The principles of cold pressure welding have been well developed. One of the principles which has evolved is that the amount of material available to flow during the welding process is very critical. Too much material will prevent complete closing of the dies and too little will prevent complete filling of the die cavity. Either event will produce less than satisfactory results.

It has now been discovered that very heavy sections can be welded by a two-step process. It is true, as before understood, that a critical amount of flow must be accomplished. This was thought to be a limitation, because large workpieces required large projection between dies and much power. Now it has been shown that a closer die spacing with two separate die closing actions, will first produce a partial weld and then act again to finish the weld.

Prior to this invention the control of the amount of material between the two mated split dies has been achieved by preparing and trimming the workpiece with respect to the face of the die after the workpiece has been clamped in the die, as shown in Barnes Patent No. 2,779,954. It has been discovered that two dies can be placed in the machine of this invention with the die faces spaced a precise distance with respect to one another in order to eliminate preparation devices. Workpieces may then be positioned in the dies with their ends in touching relationship. Then, because the dies are properly spaced originally, the amount of material within the dies will be within acceptable range limitation permitting a uniform weld. The ends must be clean and relatively square, but need not be spaced to the die face as before.

Because the amount of material between the dies will vary according to the size and shape of a particular workpiece, the spacing between dies for various workpiece sizes will be different. According to this invention, stop pins 56, 57, 58, and 59, as best illustrated in Figure 3, are employed as back stops to limit the spacing of the dies. Then, the actual die length can be accurately calculated to allow just the correct amount of space between the die faces.

Even the most accurate calculations and the most accurate machine work cannot be counted upon to produce absolutely perfect spacing between die faces which will remain perfect under operating conditions. Furthermore, some workpieces, particularly when the workpieces are drawn wire, will vary in size from piece to piece or from batch to batch of the workpiece material, and hence some adjustment of the space between the dies is desirable, and often essential, for good results. Accordingly, reference to Figure 4 will reveal an improved die spacing mechanism carrying the basic principles of die spacing forward in an improved manner.

Figures 4, 5:
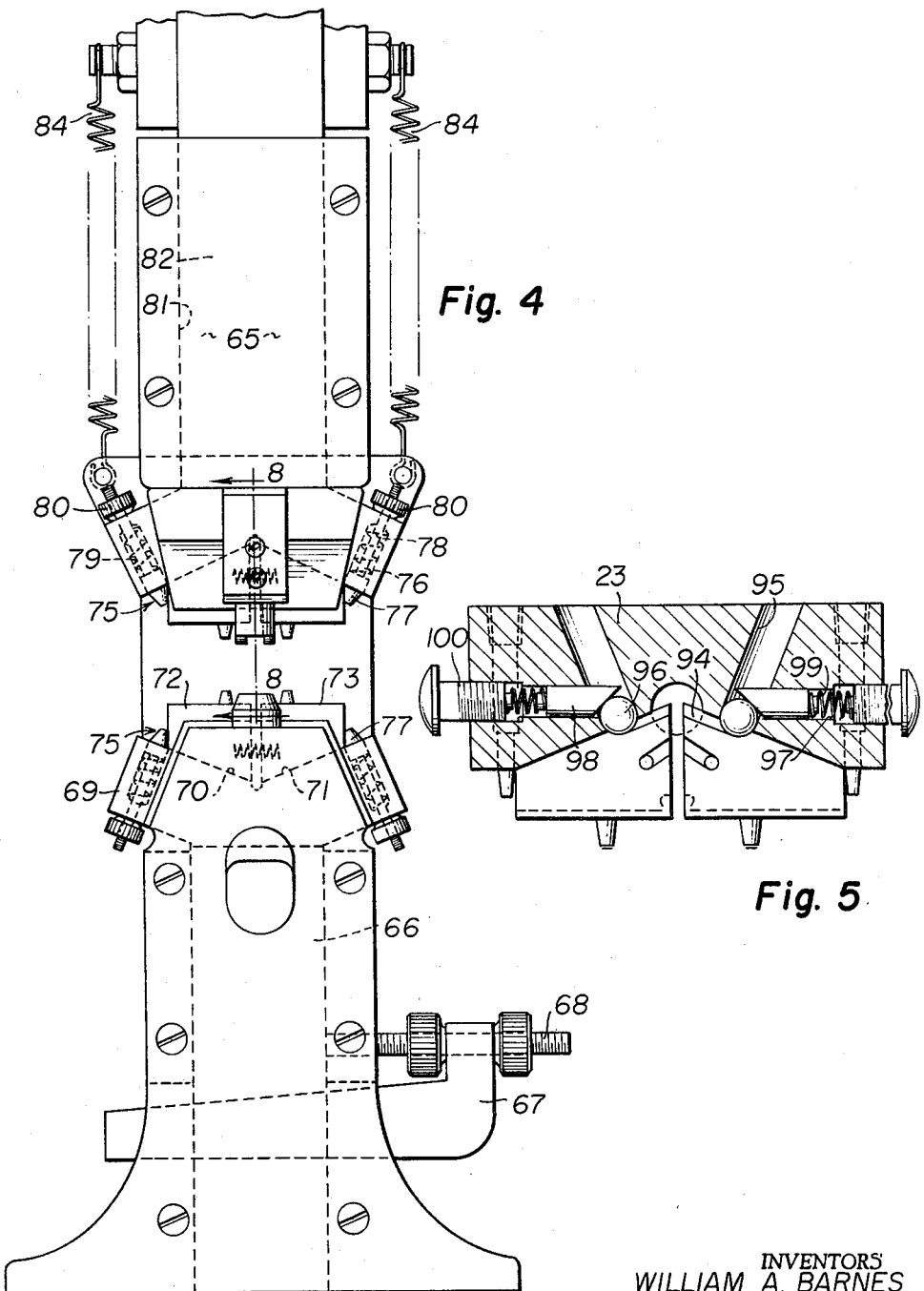
Figure 4 is a front view of a press device embodying relatively closable carriage devices and embodying improved die spacing apparatus as an illustration of an adjustable modification of the die spacing portion of this invention.
Figure 5 is an illustration of a die carriage, such as the upper die carriage of Figure 4, partially broken away to reveal interior detail, and embodying the improved die retainer construction principles of this invention.

Figure 4 illustrates the improved adjustable die stop pin device of this invention, as set forth in the environment of an improved press device. The function of the improved press device shown in Figure 4, insofar as cold pressure welding is concerned, is not substantially different than that shown in Figures 1 through 3. This press of Figure 4 has a base die bed 65 with an adjustable bed 66. A taper wedge 67 provides a degree of vertical adjustment. An adjustment device 68 is provided to accurately determine the position of the wedge 67 and thereby accurately determine the vertical adjustment of the bed 66.

This particular press device is top actuated. A guide 81 is provided to guide a ram 82 which in turn is driven through a fixed reciprocal work path cycle by a hydraulic power unit 83. Springs 84 may be provided to return the ram 82 if a conventional one-direction piston and cylinder unit is employed. Generally such piston and cylinder devices, unless elaborately equipped, have a fixed travel. Hence the adjustment of the adjustable bed 66 becomes a desirable feature.

The bed 66 has a Y head 69 providing inwardly sloping cam surfaces 70 and 71 substantially identical to the corresponding cam surfaces set forth in Figure 1. Likewise die members 72 and 73 are laterally shiftable along such die surfaces by means of lateral force components generated through the cam surfaces.

In Figure 2 the stop pins 56 through 59 were described as being the stop pins which determined the maximum die separation. In this embodiment of the invention adjustable die stop pins 75 are provided. These adjustable stop pins 75 are conveniently constructed of a central pin member 76 having a frusto-conical head 77. A bore 79 provides an operating housing. A spring 78 within the housing surrounding the pin 76 abuts the head 77 and urges the conical head 77 out of the bore 79. The rear part of the pin 76 is threaded and provided with an adjustment lock nut 80. Accordingly, rotation of the lock nut 80 will determine the forward projection of the conical head 77. Examination of the Figure 4 will reveal that the conical side walls of the head 77 are positioned at such an angle that they will always extend in a parallel position with respect to the back wall of the co-operating die. Hence, the conical head may be adjusted forward or retracted in order to present an infinitely adjustable backstop against which the die may come to rest. Hence, minor variations in workpiece size and in the condition of the dies may be compensated by the adjustable nature of this improved stop pin device.

As previously described, the action of this type cold pressure welding device consists of first closing split die half-members together upon a workpiece, and then causing the two closed split dies to move toward one another with a definite cold pressure welding action to squeeze the metal and cause the particular type of action known as cold pressure welding. This cold pressure welding produces a flow of metal laterally within confined recesses on the face of the dies. It is not fully understood why a flow of metal into a waste flange is necessary, but the fact remains that such a flange is formed. Furthermore, the first side flow of metal is not fully welded. A hybrid type of union exists. This union can be separated if force is applied in a particular manner directly opposed to the plane of the union. Such separation can cause a plane of weakness to extent into the fully welded area and disrupt or materially weaken the actual weld which has been formed. This is especially a hazard with smaller work pieces. Hence, a problem has been encountered where four die members close together as described, and are then forcibly returned to their starting position all at one time. Such unitary separation sometimes causes the described concentration of direct pull upon the flange formed in producing the weld and results in weld failure. According to this invention, two of the die members, namely the upper two die members, are caused to stay up together upon the workpiece after the press begins to separate, and the bottom two die members are allowed to separate in their normal manner. By this action two dies are stripped away from the weld flange while the weld flange is maintained by another two dies holding tight upon the flange. Thereafter, the second two dies are permitted to separate and drop the welded union free.

Figure 7:
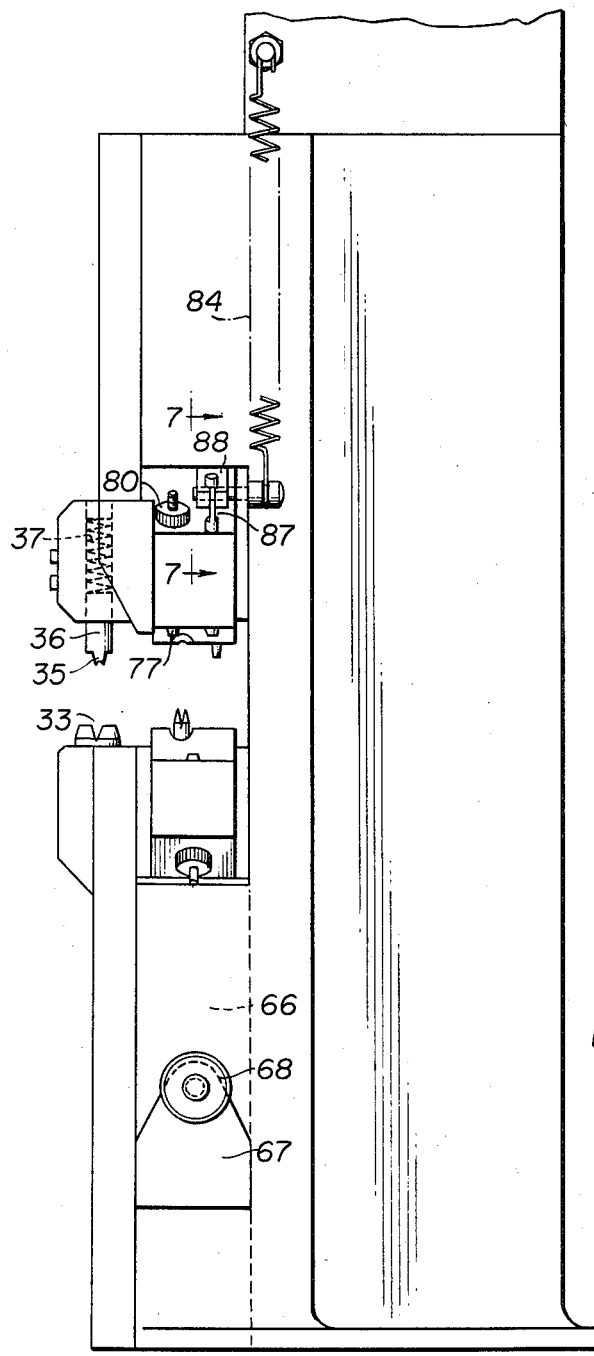
Figure 7 is a detail illustration of the retaining device as taken substantially along the lines 7—7 of Figure 6; and, Figure 8 is a section through the trimming structure as indicated by line 8—8 of Figure 4.
Figure 7:
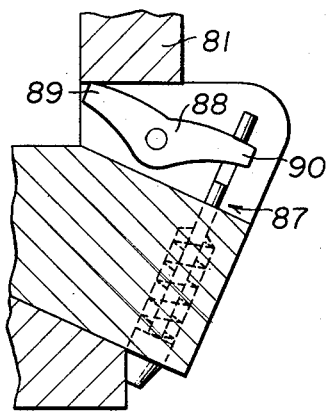
Figure 6:
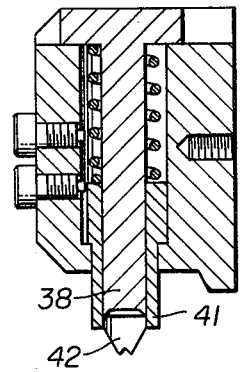
Figure 6 is a side view of the press of Figure 4, and illustrates the location of a die following and retaining device serving to hold the upper dies of the press of Figure 4 closed upon the welded workpiece after a work cycle until the upper and lower carriage have separated.

The apparatus to carry out this concept may be seen in phantom in Figure 4 and in side view in Figure 6. Figure 7 is a fragmentary portion of the press showing a front view of the apparatus without the confusing presence of the die adjustment pins in front of the apparatus as it appears in Figure 4. This apparatus consists of a die release pin 87 which is essentially the same in construction as the adjustable die stop pin 75 in the conical head and stem construction with an urging spring. However, there is no lock nut 80 provided. The pin is free to move with the dies. In the illustrated embodiment of this use of the invention, such die release pins are applied only to the top dies carried by the ram 82. As the press causes the top dies to close in the pressure welding action, the cone portion of die release pins 87 will follow along with the die. When the ram 82 reverses and pulls away from the completed work, the dies of the upper press cannot separate because the angle of the die release pins 87 is such that the pin will bind and refuse to separate. Withdrawal of the pin is accomplished in a unique manner. A die release trigger 88 is provided. Release trigger 88 is pivoted at its center and is provided with a wing 89 and a wing 90. As may readily be seen in Figures 4 and 7, the wing 89 is positioned to contact a part of the guide 81 on the upward stroke and the wing 90 is forked to engage the top of the die release pin 87. Hence, although the pin will be urged to follow the die, it will be withdrawn when the trigger wing 89 strikes the guide surface 81. Hence, release of the top dies is withheld until the ram 82 returns the top die assembly substantially to its rest position.

As previously indicated herein, it has always been considered necessary to produce the entire weld and all of its lateral flow in one continuous action. It has now been discovered that the apparatus as set forth herein may be employed to weld together two workpieces in a preliminary union, and then that union brought to a high degree of perfection by closing the dies upon the already united pieces to further flow the material together into an even greater flange.

Figure 8:

As best shown in Figure 8, an anvil 33 and a punch 38 cooperate to cut two workpieces simultaneously. Anvil 33 is tubular with a central opening 39. Punch 38 is tubular and has an outside diameter closely fitting opening 39. Notches 40 on the anvil provide beds to hold two workpieces. A spring urged tubular sheath 41 surrounds the punch 38 and has projecting finger portions 42 to engage workpieces in the notches 40 and hold the workpieces until the punch 38 descends and trims the ends off the workpieces.

The operator then transfers the workpieces into the bottom of the opposed die sections with the ends thereof in contact. Best results are obtained when the abutment joint is substantially central of the gap between the dies. The dies are then actuated to close upon the positioned workpieces and hold and ram the workpieces together in the described cold pressure welding action. If a two-step process is to be employed, the workpieces are maintained in the dies and the dies are re-actuated.

Although prior butt welding equipment could be employed to produce a double upset weld, the embodiment of the invention here illustrated wherein the top dies are held closed until the bottom dies have separated is ideal and carries out such double upset action with the utmost of ease and perfection. The welded pieces will almost invariably stick to the upper dies, and accordingly this apparatus will allow the separation of the bottom dies and then the later separation of the workpiece from the top dies, whereupon the workpieces may be dropped down and the flash recentered between the dies and the process repeated. This function is extremely simple and produces exceptionally good welds.

Bearing in mind the fact that the grip produced upon a workpiece by the upper and lower die halves is determined by the resistance to lateral movement of the coupled die halves after they have been united, it will at once become apparent that heavy workpieces will be difficult to hold in the dies without some means of producing a tighter grip upon the workpieces. Reference to Figure 5 of the drawings will disclose the improved means of this invention for producing such improved grip. If the die halves were not able to move laterally at all, it would be obvious that all of the closing force of the press would be used directly in a clamping force of the workpieces between the upper and lower die halves. Consequently, any approach to such immobility will produce a degree of increased holding force. In Figure 5, which is a fragmentary section of the top carriage 23 of the device shown in Figure 1, the top dies may be seen to each have a raceway 94 over a part of the length thereof along the cam bearing surface. Bores 95 are provided in the carriage. A ball 96 is inserted through the bore 95 and engages into the rear portion of race 94. Hence, if the dies are too close together they must first dislodge the balls 96 from the races 94 and force the balls backwardly into the bores 95. In order to control the resistance to such dislodging of the balls 96, a lateral bore 97 is provided and into this bore is inserted a plug 98 urged forward by means of a spring 99. The tension upon spring 99 is maintained and adjusted by means of a threaded tension retainer 100. Hence, it will be seen that the resistance to dislodge of the ball 96 from the race 94 may be adjusted at will be rotation of the tension retainer 100. By this means, the degree of force between the upper and lower split die members may be predetermined and materially increased before any lateral movement of the dies is experienced in a closing action. Springs 54 and 55 will provide part of the resistance and will also provide the returning force to urge the dies to a starting position against the retaining pin, but the improved resistance device as shown and described with respect to Figure 5 provides a more flexible and uniform resistance which can be adjusted to suit the needs of a particular workpiece, and may be adjusted quite readily during a work period in order to compensate as the work results are observed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. A machine for cold pressure welding, comprising, a first and a second relatively closable carriage, each carriage having a composite jaw adapted in connection with a supporting member with a pair of adjoining angular disposed cam surfaces to form a part of a machine for pressure welding, and comprising on each carriage a pair of side by side die sections movable to and from one another, the die sections each having a forward face contactable by a like forward face of the opposed die of the pair as they close together, a rear face surface on the opposite side of each die section facing the direction of movement as the die sections move apart, the die sections being provided with cam surfaces in sliding engagement with the cam surfaces of the supporting member respectively, like positioned die sections of each carriage mating as parts of a split workpiece holding die, each die section of the first and second carriage provided with a stop means at the rear face thereof, each stop means having a conical head to contact the die, means establishing said stop for longitudinal adjustment along a path wherein the conical wall of the head is adjustable throughout a range along the path of reciprocation of the mating split die section, a die retainer for the die sections of said first closable carriage, each said die retainer adapted to follow the associated die in a closing movement of the die and being adapted to resist reverse movement, and a trigger operated release to return said retainer to its rest position after separation of the split dies upon retracting movement of the first and second closable carriages.

2. A composite jaw adapted in connection with a supporting member with a pair of adjoining angularly disposed cam surfaces to form part of a machine for cold pressure welding of workpieces, said supporting member having a forward and a withdrawal movement, and comprising a pair of side by side die sections movable to and from one another, provided with cam surfaces in sliding engagement with the cam surfaces of the supporting member respectively, said die sections being driven along the angular paths of the angularly disposed cam surfaces toward one another by resolved forces produced by contact of the dies with another object, a die retainer for each said die section, each said die retainer having a body mounted to reciprocate along a path at a lock angle to said individual path of the die section with which it cooperates, said angle being a lock angle in that force by the die against the retainer will not move the retainer, said retainer having a head shaped to follow in contact with the die as the die moves in closing by moving in its said path, and separate retainer release means operable to withdraw said retainer and permit return movement of the die.

3. A composite jaw adapted in connection with a supporting member with a pair of adjoining angularly disposed cam surfaces to form part of a machine for cold pressure welding of workpieces, said supporting member having a forward and a withdrawal movement, and comprising a pair of side by side die sections movable to and from one another provided with cam surfaces in sliding engagement with the cam surfaces of the supporting member, respectively, said die sections being driven along the angular paths of the angularly disposed cam surfaces toward one another by resolved forces produced by contact of the dies with another object such as mated die sections, a die retainer for each said die section, each said die retainer having a body mounted to reciprocate along a path at a lock angle to said individual path of the die section with which it cooperates, said angle being a lock angle in that force by the die against the retainer will not move the retainer, said retainer having a head shaped to follow in contact with the die as the die moves in closing by moving in its said path, a trigger lever positioned to contact a fixed position actuator upon withdrawal movement of said supporting member to return said die sections to their starting position, said contact being made after a period of such return movement to provide separation of said die sections from any other contact prior to separation of the die sections from one to another.

4. A cold pressure welding device comprising, first and second support members relatively reciprocable along a path of travel, each said member having first and second cam surfaces, the first member cam surfaces forming a V symmetrically disposed about said member path of travel, the second member cam surfaces also forming a V symmetrical about said member path of travel, said first and second member V's being inverted with respect to one another, first, second, third, and fourth die sections, each of said die sections having a cam surface coacting with one of the support member cam surfaces, said first and second sections being carried by the first member, said third and fourth sections being carried by the second member, said first and third sections being a first split die, said second and fourth sections being a second split die, means urging said first and second sections apart to an initial work position and urging said third and fourth sections apart to a like initial work position, said first and third sections in said initial work position being positioned to abut in a work piece grip action upon closure of said first and second members along said path of travel and to slide together as a unit in such contact by cam action toward the third and fourth sections, said third and fourth sections in said initial work position being positioned to abut in a work piece grip action upon closure of said first and second members along said path of travel and to slide together as a unit in such contact by cam action toward the first and second sections, the die section faces moving toward like die section faces in such slide closing movement being designated as forward faces and the opposed surfaces being designated as rear faces, and releasable retraction lock means associated with each said die section of said first support member preventing return of said die sections to the said initial work position until released.

5. In association with the releasable retraction lock means defined in claim 4, the provision of a lock means release trigger carried with the first support member, said trigger having a release contact position to be actuated by contact with a fixed contact surface upon retraction of said first support member away from the second support member.

6. In the device as defined in claim 4, said releasable retraction lock means being a bore opening through the support member cam surface, said bore having an axis substantially normal to said cam surface, a lock plunger mounted to reciprocate in said bore, said plunger having a forward end projecting from said bore into contact with a rear face of the die section which rides said cam surface, spring means urging said lock plunger out of said bore and against said die, and a retraction drive device interconnected to said lock plunger and adapted for mechanical retraction of said lock plunger against the urge of said spring.

References Cited in the file of this patent

UNITED STATES PATENTS

| | | |
|---|---|---|
| 45,187 | Spaulding | Nov. 22, 1864 |
| 142,774 | Crooke | Sept. 16, 1873 |
| 994,686 | Mitchell | June 6, 1911 |
| 1,393,040 | Richard | Oct. 11, 1921 |
| 1,583,554 | Hoover | May 4, 1926 |
| 2,144,231 | Schwarz | Jan. 17, 1939 |
| 2,357,204 | Joyner | Aug. 29, 1944 |
| 2,428,675 | Moore | Oct. 7, 1947 |